Patented Oct. 14, 1952

2,614,116

UNITED STATES PATENT OFFICE 2,614,116

PRODUCTION OF HYDROCARBON-OXY PHOSPHORYL MONOFLUORIDES

Willy Lange, Cincinnati, Ohio, and Archie Hood, Tulsa, Okla., assignors to Ozark-Mahoning Company, Tulsa, Okla., a corporation of Delaware No Drawing. Application February 23, 1949, Serial No. 78,018

7 Claims. (Cl. 260—461)

This invention relates to organic phosphoryl monofluorides and is particularly directed to the production of hydrocarbon-oxy phosphoryl monofluorides from polyphosphoric acid esters.

The literature contains reports of laboratory preparation by somewhat complicated procedures of certain dialkoxy phosphoryl monofluorides; the diisopropyl compound has been produced on a fairly large scale and certain physiological experiments have been made with it to determine its effects on the nervous system while other research has been directed to its exploitation in treatment of human diseases and other abnormal conditions.

Until the present invention, however, none of the known dihydrocarbon-oxy phosphoryl monofluorides has been produced by relatively direct reaction while the mono-hydrocarbon-oxy hydroxy phosphoryl monofluorides, which may be made available through practice of the invention, have been previously unknown.

It is therefore among the objects of the present invention to provide a method of synthesizing hydrocarbon-oxy phosphoryl monofluorides in commercially useful quantities and at relatively high degrees of purity, the invention including not only production in a novel manner of compounds heretofore known but contemplating as well the synthesis of a type of compounds heretofore wholly unknown.

A further object is to produce any of a series or group of novel compounds by a relatively direct procedure which enables substantially any mono-hydrocarbon-oxy hydroxy phosphoryl monofluoride to be readily synthesized and recovered, either as the acid itself or as one of its salts, economically and in substantial quantity.

Other objects, purposes and advantages of the invention will be apparent from or more fully brought out in the following description of its practice with particular reference to the production of hydrocarbon-oxy phosphoryl monofluorides which offer immediate interest in connection with study of certain physical and nervous disorders of the human body, in higher concentrations as poisons for extermination of insects and other pests, and in the study of fungicides.

Certain dialkoxy phosphoryl monofluorides have been produced by methods described in the literature, as by synthesis of dialkyl acid phosphites through reaction of phosphorus trichloride with an alcohol followed by chlorination of the product and reaction of the resulting dialkoxy phosphoryl monochloride with sodium fluoride, but such methods involve many reactions, entail correspondingly great expense and there is no evidence that they are applicable to so wide a range of substances as is the method of our invention.

In accordance with the latter, as one of the starting materials for use in the production of a desired phosphoryl monofluoride we select a corresponding polyphosphoric acid ester, fundamentally one in which at least one oxygen atom is bonded to two phosphorus atoms, and thus containing in its molecule what we term a P—O—P bridge, the presence of which, in at least one of the starting materials, is essential to the success of our method of producing any of the phosphoryl monofluorides which may be obtained by its practice.

While we are satisfied that our reactions proceed as hereinafter described substantially irrespective of the character of the hydrocarbon groups bonded to either or both of the P atoms in the said P—O—P bridge, we recognize some hydrocarbon groups themselves are capable of reaction with HF or of polymerization in its presence and while such reaction or polymerization normally occurs after the reaction contemplated by our invention, it may follow so quickly thereafter as for all practical purposes to be indistinguishable therefrom. The occurrence of such supplemental reactions ordinarily prevents recovery of the desired hydrocarbon-oxy phosphoryl monofluorides corresponding to the hydrocarbon groups comprised in the original organic starting material but results in production of complex molecules of substances of no commercial importance. It is believed it is the presence of aliphatic unsaturation in certain compounds containing P—O—P bridges which imparts to them a tendency to enter reaction between the hydrocarbon groups and HF, or to polymerize, immediately after or substantially simultaneously with the breaking of the P—O—P bridge on exposure of the molecules to HF in accordance with the practice herein disclosed; hence starting materials containing an hydrocarbon group having any aliphatic unsaturation are unsuitable for the practice of our invention and their use should therefore be avoided.

Thus a typical neutral polyphosphoric acid ester of open-chain structure may be represented by the formula:

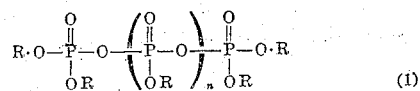

(1)

in which R represents any hydrocarbon group and $n$ any integer including zero within the range of compounds of this type; the simplest case, namely that in which only a single P—O—P bridge exists, is presented when $n$ equals zero and the formula then generally represents a pyrophosphoric acid tetra ester thus:

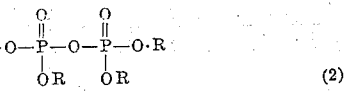

(2)

It is apparently immaterial to the successful practice of our invention what value $n$ may have in Formula 1 or what hydrocarbon group R represents; in Formula 2 at each phosphorus atom one OR group may be replaced by an OH group. Thus the sole essential conditions as far as we are aware are that the compound selected in any given instance as one of the starting materials contain as stated at least one P—O—P bridge and that at least one hydrocarbon-oxy group be bonded to each P atom, our procedure involving reaction between such a compound and anhydrous hydrogen fluoride. As the reaction in general is exothermic, it should be carried out under conditions providing for dissipation of heat as rapidly as produced and preferably at a relatively low temperature.

In preparing for the reaction we may introduce a suitable quantity of liquid anhydrous hydrogen fluoride (HF) into a container cooled for example to about —20° C. and with the HF at a corresponding temperature then add slowly and progressively, but as quickly as dissipation of heat permits, small quantities of the compound which has been selected. The mass is occasionally agitated during the addition and the heat evolved is dissipated to maintain the temperature of the mass at least 50° C. below the temperature of thermal decomposition of the products, preferably at not in excess of +20° C., until the organic compound has been introduced in the desired amount as will hereafter more fully be explained. After complete addition of the organic compound the mass is allowed to attain room temperature which enables any uncombined HF to be then readily removed by passing dry air through the mass preferably while it is maintained under reduced pressure.

After air washing in this manner the reaction product is separated into fractions desirably by vacuum distillation at a pressure in the range of 0.001 to 1.0 mm. of mercury and at whatever temperatures may be required, in accordance with the well known principle, to effect its fractionation. Usually after the first distillate is recovered it is further purified by redistillation at atmospheric or reduced pressure while the residue of the first fractionation may be further separated by short-path vacuum distillation to recover a second reaction product in relatively pure state and the latter may also be redistilled if desired.

The reaction between the HF and the organic compound selected proceeds in accordance with the following general type equation, based on employment of an open-chain compound corresponding to Formula 1 above:

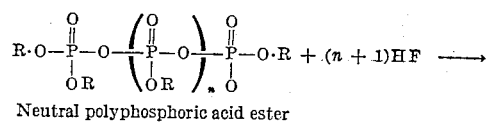

Neutral polyphosphoric acid ester

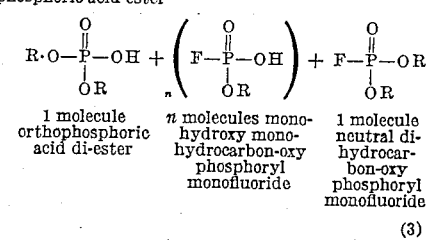

| 1 molecule orthophosphoric acid di-ester | $n$ molecules mono-hydroxy mono-hydrocarbon-oxy phosphoryl monofluoride | 1 molecule neutral di-hydrocarbon-oxy phosphoryl monofluoride |

(3)

For this equation it is evident stoichiometric quantities of the reactant to be employed may easily be determined in accordance with well known principles. As it is essential that substantially the stoichiometric quantities calculated in accordance with the above equation, making allowance for impurities in the organic starting material, should enter into the reaction in order to carry it to completion, it is desirable to supply a small excess of HF, not more than a few per cent., over the calculated quantity, but as any such excess in the reaction product breaks down the latter it should be promptly removed as above described, after the reaction has gone to completion. Failure to remove a small excess of HF or the presence of a large excess if permitted to react with the reaction product results in partial or complete destruction of the latter, and it is thus of critical importance that no reaction between the reaction product and HF be permitted.

Usually the first distillation of the reaction product yields a distillate containing substantially all the more volatile of the phosphoryl monofluorides produced in the reaction, or in the simplest case using a compound of Formula 2 the single phosphoryl monofluoride produced by reaction in accordance with the following equation:

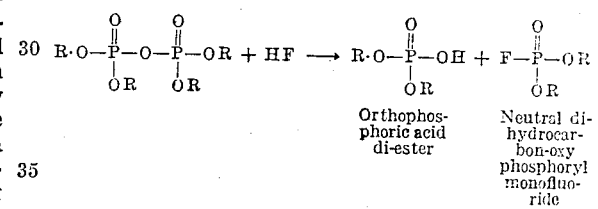

Orthophosphoric acid di-ester / Neutral di-hydrocarbon-oxy phosphoryl monofluoride (4)

The residue of the second distillation when two fluorides are produced, or of the first when there is only one, normally contains the orthophosphoric acid ester resulting from the breaking of the P—O—P bridge, the phosphoryl fluorides generally being the more volatile under the distillation conditions employed. In some instances, however, a relatively large proportion of the orthophosphoric acid di-ester may be found in the distillate and a correspondingly smaller one in the distillation residue. As is evident from Equations 3 and 4 the highest yields of the di-hydrocarbon-oxy phosphoryl monofluorides and correspondingly lower yields of the mono-hydroxy mono-hydrocarbon-oxy phosphoryl monofluorides are obtained when $n$ is small, none of the latter being produced from reaction of the pyrophosphoric acid tetra esters, i. e. when $n$ equals zero in Formula 1 whereas when $n$ is unity the center P group forms one molecule of mono-hydroxy mono-hydrocarbon-oxy phosphoryl monofluoride and each additional P group present as $n$ progressively increases forms an additional molecule thereof, thus increasing the proportion of the latter in relation to the quantities of the orthophosphoric acid di-ester and the di-hydrocarbon-oxy phosphoryl monofluorides produced respectively by the end groups of the chain as the result of the splitting of the bonds in the P—O—P bridges.

The open-chain polyphosphate esters appear to react as molecules with linear arrangement of the P—O—P chains and not in the form of branched systems but when neutral polyphosphate esters of ring structure are reacted with hydrogen fluoride, no end groups are present, and hence essentially monohydroxy mono-hydrocarbon-oxy phosphoryl monofluorides alone are formed, as is illustrated by the equation:

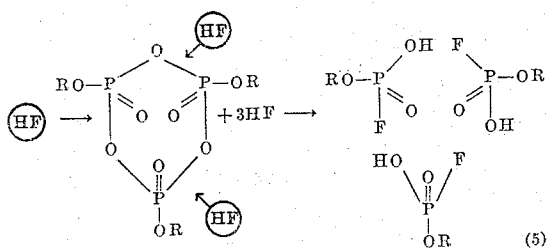

However, the exact mechansms of the reactons taking place in the polyphosphate molecules and also the chain or ring character of the polyphosphate molecules are of no significance for the execution of our invention; they are presented merely for purposes of illustration. It is essential only that in the starting ester there be present at least one P—O—P bridge, each phosphorus atom in the latter being attached in turn to at least one hydrocarbon-oxy group.

In the case of certain of the higher molecular weight compounds, after removal from the reaction mass of the more volatile di-hydrocarbon-oxy phosphoryl monofluoride by vacuum distillation, a different procedure may be employed for recovery of the mono-hydrocarbon-oxy phosphoryl monofluoride, especially if, as may sometimes be the case, an alkali metal salt of the fluoride rather than the fluoride itself is the desired end product, as these fluorides readily may be neutralized by reaction with an alkali hydroxide and the resulting salt then recovered in substantially pure form by fractional crystallization.

The alkali salts of the mono-alkoxy phosphoryl monofluorides in particular show strong fungicidal properties, and having low toxicity for mammals may be suitable compounds for use in inhibiting growth of mold in or on materials treated with them; their typical formula is as follows:

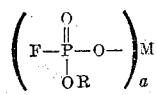

wherein M represents an alkali metal, R an alkyl radical and $a$ the valency of the metal.

The following are specific examples of different ways of performing the method of our invention in the production of said phosphoryl monofluorides.

*Example 1.*—44.5 parts of tetraethyl pyrophosphate $(C_2H_5)_4P_2O_7$ of 95% purity was added slowly in small portions and with occasional shaking to 3.2 parts of liquid, anhydrous hydrogen fluoride in a platinum bottle cooled to $-20$ to $-40°$ C. Each small addition of the pyrophosphate resulted in the liberation of a noticeable amount of heat, so that some time was required after each addition for the contents of the platinum bottle to reach a temperature of about $-20°$ C. After the addition of tetraethyl pyrophosphate was complete, the resulting liquid product was allowed to come to room temperature. Traces of excess hydrogen fluoride were removed by passing dry air through the liquid under reduced pressure, and then the reaction product was separated into two fractions by vacuum distillation.

The first fraction of 22.5 parts came over for the most part at room temperature at a pressure of 0.3 to 0.4 mm. of mercury. Analysis showed 12.0% F and an acidity equivalent to only 0.43% HF, whereas the value calculated for

is 12.17% F. After redistillation at 170–1° C. under atmospheric pressure, the following analytical data were determined: 19.25% P, $n_D^{20}$ (index of refraction for 20° C. and sodium light) 1.3734, $d_4^{20}$ (specific gravity at 20° C. with reference to water at 4° C.) 1.1456; calculated for $(C_2H_5O)_2POF$: 19.85% P; reported in the literature $n_D^{24.2}$ 1.3729, $d_4^{22.2}$ 1.144.

The second fraction of 23.4 parts was obtained by short-path distillation; the liquid came over for the most part at a jacket temperature of about 105° C. and at a pressure of 0.01 mm. of mercury. It had a neutralization equivalent of 149 and contained 1.4% F, whereas the values calculated for $(C_2H_5O)_2(HO)PO$ are 154.1 and zero, respectively.

From these fractionations and analytical data, the reaction product was found to contain at least 46% diethoxy phosphoryl monofluoride,

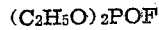

and 44% diethyl phosphoric acid,

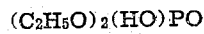

The splitting of the polyphosphate by hydrogen fluoride according to the equation

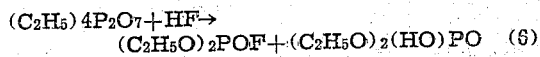

was shown to be rapid and complete.

*Example 2.*—In accord with the reaction conditions of Example 1, 113 parts of commercial diethyl diacid pyrophosphate $(C_2H_5)_2H_2P_2O_7$ was added slowly with cooling, to 11.0 parts of anhydrous hydrogen fluoride. The resulting reaction product was subjected to short-path distillation at a pressure of 0.001 mm. of mercury, and 61 parts of distillate, obtained at a jacket temperature of 80–135° C., contained 12.9% F, which corresponds to 87% $(C_2H_5)(HO)POF$ in the distillate. A residue of 56 parts of relatively nondistillable liquid, which was found to be essentially $(C_2H_5O)(HO)_2PO$ by means of the ready formation of large quantities of the insoluble white silver salt, contained 0.94% F, corresponding to 6.3% $(C_2H_5O)(HO)POF$. Therefore the reaction product was found by distillation methods to contain 45.6% monoethoxy monohydroxy phosphoryl monofluoride, $(C_2H_5O)(HO)POF$, along with 48.7 parts of monoethyl phosphoric acid, $(C_2H_5O)(HO)_2PO$.

The distillate was purified by two short-path redistillations, and the following analytical data were obtained on a fraction distilling at a jacket temperature of 55–8° C. under a pressure of slightly less than 0.001 mm. of mercury: 14.8% F, 24.47% P, M. W. (molecular weight) 128–9, $n_D^{20}$ 1.3668, $d_4^{20}$ 1.3185; calculated for

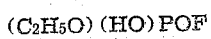

14.84% F, 24.2% P, M. W. 128.05.

The potassium salt, $(C_2H_5O)(KO)POF$, was prepared by simple neutralization with aqueous KOH and through subsequent evaporation by vacuum desiccation over concentrated sulfuric acid. The analysis of the dried potassium salt was as follows: 11.8% F, 18.55–18.60% P, M. P. 166.0–167.5° C.; calculated for $(C_2H_5O)(KO)POF$: 11.44% F, 18.65% P. Hydrolysis of the salt in boiling, neutral or slightly alkaline, aqueous solution took place at a rate of less than 0.1% per hour, and the hydrolysis rate in N/10 aqueous hydrochloric acid at room temperature did not exceed 0.25% per hour; these results demonstrate the surprisingly great stability of the $(C_2H_5PO_3F)^-$ ion.

The main reaction proceeded in accordance with the following equation:

$$(C_2H_5)_2H_2P_2O_7 + HF \rightarrow (C_2H_5)(HO)POF + (C_2H_5)(HO)_2PO \quad (7)$$

*Example 3.*—29.3 parts of a liquid with an empirical formula corresponding to $(C_2H_5)_5P_3O_{10}$ was added slowly to 3.7 parts of anhydrous hydrogen fluoride in the same manner as described in Example 1.

Vacuum distillation using a pressure of about 1 mm. and a bath temperature below 60° C. yielded 6.1 parts of liquid containing 11.7% F. This corresponds to 17.8% diethoxy phosphoryl monofluoride, $(C_2H_5O)_2POF$, in the reaction product.

Short-path distillation of the residual liquid at a jacket temperature of 70 to 120° C. and a pressure of 0.001 mm. produced 27.3 parts of distillate containing 8.08% F, which corresponds to the presence of 45% $(C_2H_5O)(HO)POF$ in the reaction mixture.

The reaction was carried out in accordance with the equation:

$$(C_2H_5)_5P_3O_{10} + 2HF \rightarrow (C_2H_5O)_2POF + (C_2H_5O)(HO)POF + (C_2H_5O)_2(HO)PO \quad (8)$$

*Example 4.*—76.3 parts of a commercial product labeled "100% Hexaethyl Tetraphosphate," with an empirical formula of $(C_2H_5)_6P_4O_{13}$ but existing as a mixture of other ethyl polyphosphates, was added, under the reaction conditions of Example 1, to 9.5 parts of anhydrous hydrogen fluoride, in accordance with the equation:

$$(C_2H_5)_6P_4O_{13} + 3HF \rightarrow (C_2H_5O)_2POF + 2(C_2H_5O)(HO)POF + (C_2H_5O)_2(HO)PO \quad (9)$$

Vacuum distillation at a pressure of 0.01 mm. and at a bath temperature below 70° C. yielded 11.5 parts of distillate containing 12.9% F, whereas the value calculated for $(C_2H_5O)_2POF$ is 12.17% F.

Short-path distillation of the residue at a pressure of 0.001 mm. and a jacket temperature of 70–125° C. gave 67 parts of distillate containing 10.0% F, which corresponds to $(C_2H_5O)(HO)POF$ with a purity of 67.4%.

The results indicate the presence of approximately 12% $(C_2H_5O)_2POF$ and 45%

$$(C_2H_5O)(HO)POF$$

in the original reaction product.

*Example 5.*—As in the preceding examples, 70 parts of a commercial grade of ethyl metaphosphate was added to 14.5 parts of anhydrous hydrogen fluoride.

Short-path distillation at a pressure of 0.001 mm. of mercury and a jacket temperature of 60 to 120° C. gave 46.5 parts of distillate containing 14.8% F and a residue of 20.9 parts containing 5.2% F. Purification of the distillate by two short-path redistillations permitted the isolation of 14 parts of monoethoxy monohydroxy phosphoryl monofluoride, $(C_2H_5O)(HO)POF$, as a fraction distilling below a jacket temperature of 37° C. at a pressure below 0.001 mm. of mercury. Analysis gave the following results: 14.9% F, M. W. 134; calculated for $(C_2H_5O)(HO)POF$: 14.84% F, M. W. 128.

The reaction was carried out according to the equation:

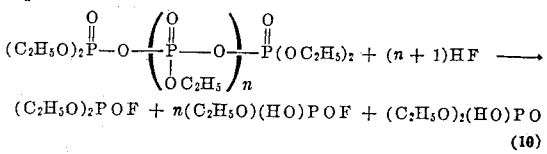

$$(C_2H_5O)_2POF + n(C_2H_5O)(HO)POF + (C_2H_5O)_2(HO)PO \quad (10)$$

where $n$ is great enough so that the reactants may be mixed for all practical purposes in accord with the approximate equation:

$$(C_2H_5PO_3)_x + xHF \rightarrow x(C_2H_5O)(HO)POF \quad (10')$$

which we have found from the above results to yield 65% of the theoretical amount of the desired acidic monoethoxy phosphoryl monofluoride.

*Example 6.*—This and the following example are given to show that the nature of the hydrocarbon group present in the polyphosphate ester has no effect whatsoever on the practice of the invention.

11.3 parts of a liquid mixture having an empirical formula corresponding to $(i\text{-}C_3H_7)_6P_4O_{13}$, was mixed, under the reaction conditions of Example 1, with 2.7 parts of anhydrous hydrogen fluoride. Distillation at 0.1 mm. of mercury and a jacket temperature below 62° C. yielded 4.3 parts of a sweet-smelling, water-insoluble liquid, indicating a yield of up to 30% diisopropoxy phosphoryl monofluoride, $(i\text{-}C_3H_7O)_2POF$.

Short-path distillation of the residue at a pressure of 0.001 mm. of mercury and a temperature of 65 to 100° C. gave 7.5 parts of liquid containing 9.1% F, whereas the value calculated for $(i\text{-}C_3H_7O)(HO)POF$ is 13.37% F. This corresponds to the presence of approximately 40% of the monoisopropoxy monohydroxy phosphoryl monofluoride in the original reaction product. Redistillation in a short-path still at a jacket temperature of 67 to 90° C. and a pressure of 0.1 mm. gave a fraction which was neutralized immediately with aqueous potassium hydroxide. Removal of water by vacuum desiccation over concentrated sulfuric acid yielded a hygroscopic white powder containing 8.50% F. Since the pure potassium salt $(i\text{-}C_3H_7O)(KO)POF$, is calculated to contain 10.55% F, this represents a purity of 80 per cent.

This example was carried out according to the equation:

$$(i\text{-}C_3H_7)_6P_4O_{13} + 3HF \rightarrow (i\text{-}C_3H_7O)_2POF + 2(i\text{-}C_3H_7O)(HO)POF + (i\text{-}C_3H_7O)_2(HO)PO \quad (11)$$

*Example 7.*—As demonstrating the practice of the method using an aryl compound, 91 parts of a nonhomogeneous mixture corresponding to the empirical formula $(C_6H_5)_5P_3O_{10}$ was added to 7.5 parts of anhydrous hydrogen fluoride in accord with the reaction conditions outlined in Example 1. Conventional type vacuum distillation at 1 to 2 mm. of mercury gave a fraction of 21.2 parts of crude $(C_6H_5O)_2POF$, from which 3.8 parts of the relatively pure compound was isolated by distillation through a short, packed column at a temperature of 117 to 120° C. and at a pressure of 0.1 to 0.5 mm. of mercury. The following analytical data were determined: 7.59% F, 12.44% P; calculated for $(C_6H_5O)_2POF$: 7.53% F, 12.28% P.

This example was carried out in accord with the equation:

$$(C_6H_5O)_5P_3O_{10} + 2HF \rightarrow (C_6H_5O)_2POF + (C_6H_5O)(HO)POF + (C_6H_5O)_2(HO)PO \quad (12)$$

and a content of at least 11.7% of diphenoxy phosphoryl monofluoride was calculated for the reaction product.

While we have referred to and prefer carrying out the principal reactions at low temperatures and at atmospheric pressures those skilled in the art will at once recognize that this is for convenience only, as it will be evident the reactions, at least in many instances, may be more conveniently and rapidly effected by heating the reacting mixture under reflux, or in a closed container system under pressure or the like, or by passing gaseous anhydrous HF through the polyphosphoric acid ester at atmospheric temperature and pressure until a sufficient quantity has been absorbed in the mass to carry the reaction to substantial completion.

It will therefore be understood we do not desire or intend to limit or confine our invention in any way to the specific examples herein described as changes and modifications in the conditions of reaction employed, in the degree to which purification of the reaction products is carried and in many other respects will readily occur to those skilled in the art and may be made if desired without departing from the spirit and scope of the invention as defined in the appended claims.

Having thus described our invention, we claim and desire to protect by Letters Patent of the United States:

1. The method of producing hydrocarbon-oxy phosphoryl monofluorides which comprises mixing anhydrous hydrogen fluoride and a polyphosphoric acid ester in which at least one oxygen atom is bonded to two phosphorus atoms, each said phosphorus atom being bonded in turn through at least one oxygen atom to the corresponding number of hydrocarbon groups which are free of aliphatic unsaturation, and after the reaction has proceeded to substantial completion fractionating the reaction products to thereby substantially isolate the hydrocarbon-oxy phosphoryl monofluorides.

2. The method of producing a hydrocarbon-oxy phosphoryl monofluoride which comprises mixing anhydrous hydrogen fluoride and a polyphosphoric acid ester in which at least one oxygen atom is bonded to two phosphorus atoms and in which all the acidic hydrogen atoms of the parent acid have been replaced by hydrocarbon groups which are free of aliphatic unsaturation, and after the reaction has proceeded to substantial completion fractionating the reaction products to thereby substantially isolate the hydrocarbon-oxy phosphoryl monofluoride.

3. The method of producing a hydrocarbon-oxy phosphoryl monofluoride which comprises mixing anhydrous hydrogen fluoride and a polyphosphoric acid ester in which at least one oxygen atom is bonded to two phosphorus atoms, each said phosphorus atom being bonded in turn through another oxygen atom to a hydrocarbon group which is free of aliphatic unsaturation, maintaining the reacting mass at a temperature at least 50° C. below the temperature at which the reaction product is thermally decomposed, and promptly after the reaction has proceeded to substantial completion fractionating the reaction products to thereby isolate the relatively pure hydrocarbon-oxy phosphoryl monofluoride.

4. The method of producing a hydrocarbon-oxy phosphoryl monofluoride which comprises mixing anhydrous hydrogen fluoride and a hydrocarbon-oxy compound containing in each molecule an oxygen atom bonded to each of two phosphorus atoms each of which is bonded in turn through another oxygen atom to a hydrocarbon group which is free of aliphatic unsaturation, in the ratio of about one molecule HF for each oxygen atom bonded to two phosphorus atoms, and after the reaction has proceeded substantially to completion physically separating from the reaction product the hydrocarbon-oxy phosphoryl monofluoride.

5. The method of producing a hydrocarbon-oxy phosphoryl monofluoride which comprises mixing anhydrous hydrogen fluoride and a hydrocarbon-oxy compound containing in each molecule an oxygen atom bonded to each of two phosphorus atoms each of which is bonded in turn through another oxygen atom to a hydrocarbon group which is free of aliphatic unsaturation, in the ratio of about one molecule HF for each oxygen atom bonded to two phosphorus atoms under conditions inhibiting escape of volatile constituents of the reaction mass, and promptly after the reaction has proceeded substantially to completion fractionating the mass to separate therefrom the hydrocarbon-oxy phosphoryl monofluoride.

6. The method of simultaneously synthesizing related but distinct hydrocarbon-oxy phosphoryl monofluorides which comprises subjecting to the action of anhydrous hydrogen fluoride a polyphosphoric acid ester having a structural formula substantially as follows:

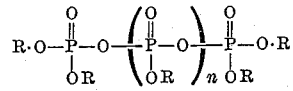

wherein $n$ has any positive value and R represents a hydrocarbon group which is free of aliphatic unsaturation, and after the reaction has proceeded to substantial completion fractionating the reaction product to thereby separate successively therefrom the said hydrocarbon-oxy phosphoryl monofluorides.

7. A composition of matter comprising in substantial concentration a mono-hydrocarbon-oxy monohydroxy phosphoryl fluoride having substantially the structural formula:

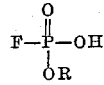

wherein R represents an organic group which is free of aliphatic unsaturation.

WILLY LANGE.
ARCHIE HOOD.

REFERENCES CITED

The following references are of record in the file of this patent:

Lange et al., Ber. deutsch chem., vol. 65 (1932), pages 1598–1601.

Schrader, British Intelligence Objectives Sub-Committee, Final Report No. 1808, released October 4, 1948 (page 5).